United States Patent [19]

Twerdochlib

[11] Patent Number: 4,900,919
[45] Date of Patent: Feb. 13, 1990

[54] WIDE BANDWIDTH FIBER OPTIC ACCELEROMETER

[75] Inventor: Michael Twerdochlib, Oviedo, Fla.

[73] Assignee: Westinghouse Electric Corp., Pittsburgh, Pa.

[21] Appl. No.: 209,124

[22] Filed: Jun. 20, 1988

[51] Int. Cl.⁴ .................... G01P 15/09; G01B 11/00
[52] U.S. Cl. ................... 250/227; 250/231 R; 73/517 R; 73/517 AV
[58] Field of Search ............ 250/227, 231 R; 73/516 R, 517 R, 517 AV, 518

[56] References Cited

U.S. PATENT DOCUMENTS

| | | | |
|---|---|---|---|
| 4,085,349 | 4/1978 | Farstadt | 73/517 R |
| 4,233,847 | 11/1980 | Walker | 73/517 R |
| 4,428,234 | 1/1984 | Walker | 73/517 R |
| 4,671,113 | 6/1987 | Carome | 250/227 |

Primary Examiner—Edward P. Westin

[57] ABSTRACT

A vibration sensor 24 is disclosed which uses a piezoelectric crystal 26 to electrically modulate the phase of a laser beam using a phase modulator 28 producing a linearly phase modulated light beam. A DC bias can be provided by a battery 60 while a photocell 64 can provide the DC bias along with a calibration signal. The sensitivity of the sensor 24 can be doubled by passing the light beam through the sensor 24 twice using a reflector 74. By routing optical fibers 20, 22 and 31 carrying a reference beam and a sensing beam along the same physical path mechanical stress effect noise can be removed.

18 Claims, 2 Drawing Sheets

WIDE BANDWIDTH FIBER OPTIC ACCELEROMETER

BACKGROUND OF THE INVENTION

1. Field of the Invention

The present invention is directed to a fiber optic vibration sensor and, more particularly, to a sensor which phase modulates a light beam responsive to the vibration of a load mass.

2. Description of the Related Art

Prior art fiber optic vibration sensors which are available from Westinghouse Electric Corporation and ASEA provide a relatively narrow bandwidth. The Westinghouse vibration sensor interrupts the light beam from a optical fiber using a vibrating screen carried by a resonantly tuned reed. The ASEA sensor specularly reflects a light beam off of a cantilevered beam which also has a resonant operating point. Amplitude modulation of the light beam occurs in the ASEA sensor because the bending cantilevered beam allows a portion of the light to escape that is, not be reflected back down the fiber). Within their narrow bandwidth the sensors can be dramatically non-linear because of the resonant tuning, thereby requiring the application of non-linear amplifiers and filters to the acceleration signal produced by the accelerometer, if the monitor which senses the light beam is not properly calibrated. These prior art sensors also have a temperature drift coefficient of from 12-36% making the sensors impractical for environments where the temperature changes.

SUMMARY OF THE INVENTION

It is an object of the present invention to produce a sensor with a very wide bandwidth. It is another object of the present invention to produce a sensor that is immune from temperature drift.

It is also an object of the present invention to produce a low cost accelerometer that does not require an external source of power.

It is a further object of the present invention to produce a accelerometer that is linear over its entire bandwidth thereby removing the need for costly non-linear correction amplifiers and filters.

It is another object of the present invention to produce a dielectric sensor that can be used at high electric potential.

The above objects can be accomplished by a vibration sensor which uses a piezoelectric crystal to electrically modulate the phase of a laser beam using a phase modulator. The phase difference between the modulated beam and a non-modulated reference beam is used to determine the acceleration.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
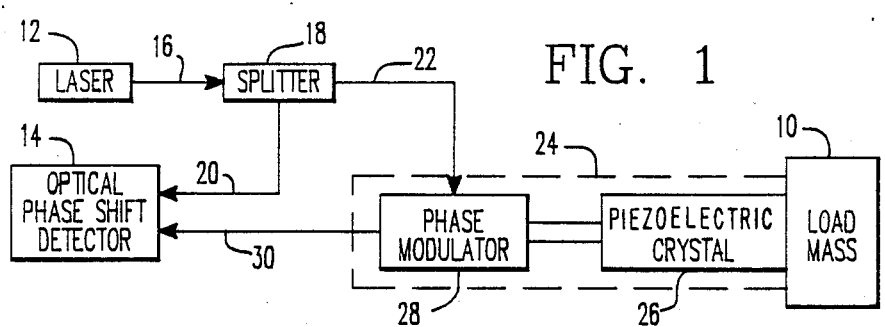
FIG. 1 illustrates a fiber optic accelerometer vibration measuring system in accordance with the present invention.

A wide bandwidth acceleration sensing system for a load mass 10 using a conventional laser 12 and a conventional optical phase shift detector 14 is illustrated in FIG. 1. A suitable conventional laser 12 can be obtained from Spectra Diode Labs, Inc. of San Jose, Calif. as model SDL-2402-HZ while a conventional detector 14, such as used in fiber optic gyroscopes, is preferred. The laser 12 produces a coherent beam transmitted over an optical fiber 16 to a conventional beam splitter 18. One half of the split beam is transmitted over a conventional optical fiber 20 to the phase shift detector 14 and is used as the reference beam with which a vibraton responsive phase shifted beam is compared to determine vibration. The comparison is essentially an addition operation in which the reference beam is added to the phase modulated sensing beam leaving the acceleration signal, for example, sin (wt $+\phi$) $+$sin (wt) $=2$ cos $\phi/2$ sin $\phi/2+$wt) where the first term to the right of the equals sign in the above equation is used to determine the magnitude of the phase shift $\phi$. The splitter 18 transmits the other split beam (the sensing beam) over optical fiber 22 to a vibration sensor 24 which is physically coupled to the load mass 10. The sensor 24 includes a conventional piezoelectric crystal 26, available from Endevco of San Juan Capistrano, Calif., which will produce an electrical signal responsive to the compression and expansion or flexing of the crystal caused by the load mass 10. Other vibration sensors, such as a velocity sensor, can be used as long as they produce a signal of approximately 1 volt. The crystal 26 has a frequency response range from about 1 hertz to several hundred megahertz. The electrical signal produced by the crystal 26 is applied to a phase modulator 28 such as the Amphenol LINI-GUIDE phase modulator series 947. The phase modulator 28 produces a phase modulated light beam which is transmitted to the optical phase shift detector 14 over optical fiber 30. The combination of the piezoelectric crystal 26 and phase modulator 28 produces a sensor 24 with a temperature drift coefficient of essentially zero from 20½ C. to 100½ C. The sensor 24 is typically less than 1 cubic centimeter in size and is capable of producing a linear acceleration signal with a wide frequency range up to several hundred megahertz. During operation the phase shift detector 14 reproduces the electrical signal of the piezoelectric crystal 26 and the reproduced signal is then treated the same as the signal produced directly by the crystal 26. Because the voltage produced by the crystal 26 is lower for lower frequencies some linearization of the detector output signal is necessary at the lower frequencies. This compensation can be provided by those of ordinary skill in the art dependent on the particular application.

Figure 2:
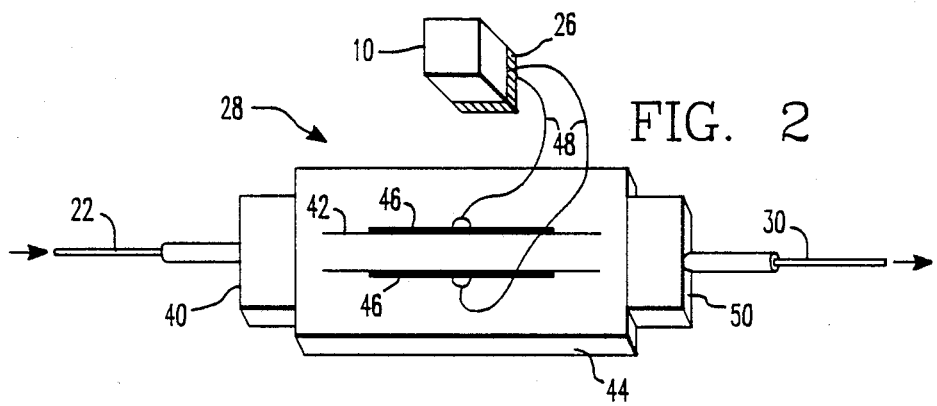
FIG. 2 illustrate the details of construction of the sensor 24 in FIG. 1.

The details of the phase modulator 28 in combination with the piezoelectric crystal 26 and load mass 10 are illustrated in FIG. 2. The light applied to the modulator 28 by the optical waveguide 22 is in the TE (Transverse Electrical) mode and is coupled to the modulator 28 by a fiber optic connector 40. The fiber optic connector 40 connects the optical fiber 22 to a titanium diffused wave guide 42 created in a lithium niobate substrate 44. The light beam is phase modulated by the application of a potential to two electrodes 46 by conductors 48 connected to the crystal 26. The waveguide 42 is coupled to fiber 30 by a connector 50. The components 40–46 and 50 are all part of the preferred modulator 28 previously mentioned. During operation, the crystal 26 produces an electric potential in response to the force exerted by the load 10 on the crystal 26. The potential causes a charge transfer to the electrodes 46 of the modulator 28. The voltage across the optical waveguide 42 develops a strong electric field therein that changes the index of refraction of the material. The change in refractive index causes a change in the light propagation speed which results in a phase shift in the light beam relative to the reference beam. Because the phase of the light beam carries the acceleration signal, the signal is independent of light source intensity.

Figures 3, 4:
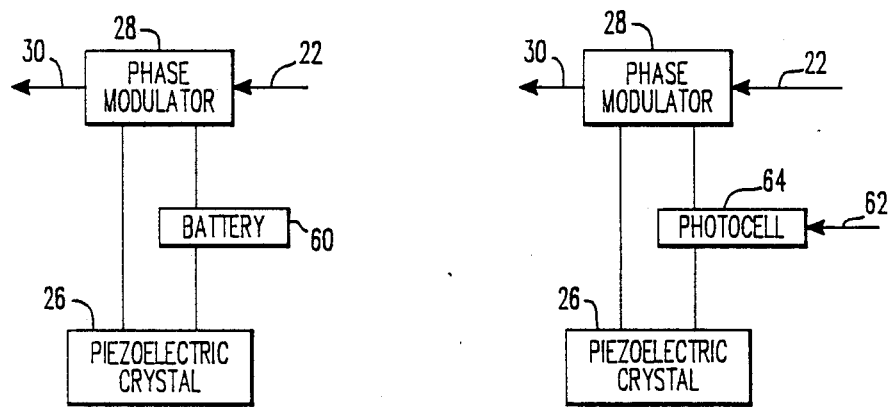
FIG. 3 depicts a configuration for biasing the acceleration signals.
FIG. 4 also depicts a system for biasing the vibration signals.

It is possible to provide a DC bias to the modulated light beam using a system as illustrated in FIG. 3. A battery 60 is connected between the piezoelectric crystal 26 and phase modulator 28 on one of the conductors to the phase modulator 28. The battery will provide a constant phase shift offset. Without a battery bias the phase shift passes through zero twice each cycle and the detector 14 will produce a rectified vibration signal. The battery bias will cause the detector output signal to always be positive and will also enhance the output signal level of low frequency vibration signals. Because the battery 60 delivers no net power to the phase modulator 28 or the crystal 26 the battery 60 will have a very long life.

FIG. 4 illustrates a second biasing scheme which uses light from a third source such as another optical fiber 62 to cause a conventional silicon photocell 64 to apply a bias to one lead of the piezoelectric crystal 26. The use of a photocell 64 not only allows the application of a constant phase shift DC type offset to bias the optical chip but will allow a calibration light signal to be transferred over the fiber 62 to allow for calibration and testing of the sensor 24. The photocell 64 can also be used to AC modulate the DC bias to produce beats in the piezoelectric crystal signal. Because photocell 64 is driving essentially infinite an impedance little power need be delivered by the fiber 64.

Figure 5:
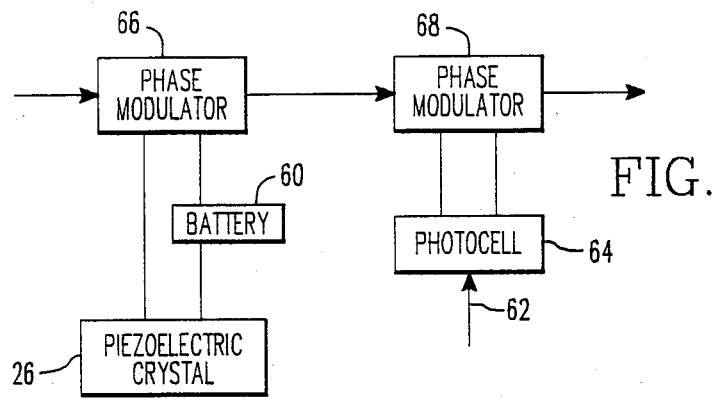
FIG. 5 illustrates another method of biasing the acceleration signals.

FIG. 5 illustrates a third method of producing a bias signal along with a calibration signal using a system that is electrically isolated from the vibration signal. This system uses tWo phase modulators 66 and 68 in series. Of course the off the shelf modulator could be changed internally to include two pairs of electrodes 46 providing a two input device. With a system as illustrated in FIG. 5 performance can be improved by providing a feedback signal to the sensor through the photocell 62 to continuously bias the phase shift introduced in the light by the crystal 26 to keep the vibration induced phase shift in the most sensitive region. For example, if a 180° phase shift is produced by the bias, the light beams will nearly cancel each other and small phase shifts produced by the crystal 26 can be hard to detect. The best bias would tend to keep the bias and vibration phase shifted beam about 90° out of phase with the reference beam.

Figure 6:
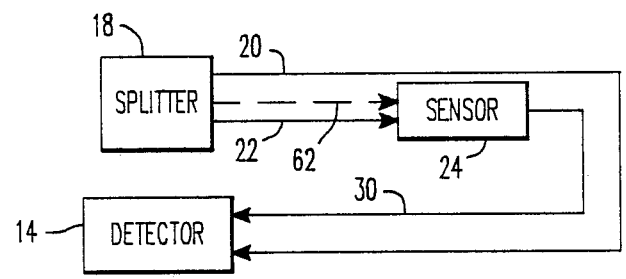
FIG. 6 illustrates a system which will eliminate low frequency phase shifts due to mechanical effects.

If the optical fibers are subject to mechanical stress which can produce low frequency phase shift noise in the beam, a system as illustrated in FIG. 6 will substantially eliminate this type of noise. In this system the fibers 20, 22 and 30 travel the same or a parallel physical pathway to the sensor 24 and from the sensor 24 to the detector 14 thereby subjecting the reference beam and sensing beam to the same phase shift. Since conventional fiber optic cable bundles include at least three fibers a conventional cable bundle is uniquely suited to noise reduction due to mechanical stress on the fibers as well as transferring the DC bias and calibration light beam.

Figure 7:
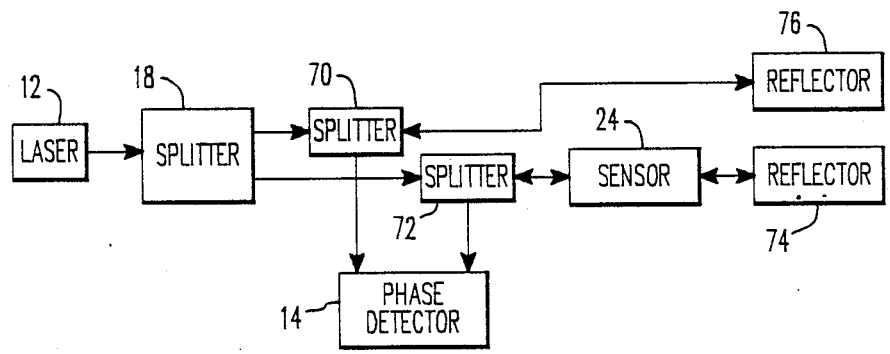
FIG. 7 illustrates a system which will eliminate low frequency mechanical effects along with doubling the sensitivity of the vibration sensor 24.

FIG. 7 illustrates a system which not only removes the mechanical bias noise but also doubles the sensitivity of the sensor 24. In this system the beam from laser 12 is split by splitter 18 and split again by conventional splitters 70 and 72. One of the split beams (the sensing b ⒠am) passes through sensor 24 and is reflected by a conventional reflector 74 while the parallel physical path of the split beam (the reference beam) is reflected by conventional reflector 76 at the same location. The return beam from reflector 74 passes back through sensor 24 and as a result is phase modulated twice by the vibration of the load 10. This doubly phase modulated sensing beam is applied to detector 14 along with the reference beam.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What I claim is:

1. An accelerometer, comprising:
  sensing means for producing an electrical acceleration signal responsive to acceleration of a load; and
  means for electrically changing the propagation characteristics of a light beam responsive to the acceleration signal.

2. An accelerometer, comprising:
  sensing means for producing an acceleration signal responsive to acceleration of a load and comprising a piezoelectric crystal coupled to the load; and
  means for changing the propagation characteristics of a light beam responsive to the acceleration signal.

3. An accelerometer as recited in claim 1, wherein said means for electrically changing comprises an optical phase modulator having an index of refraction changeable by an electrical field applied thereto.

4. An accelerometer as recited in claim 1, further comprising bias means for biasing the electrical acceleration signal.

5. An accelerometer, comprising:
  sensing means for producing an acceleration signal responsive to acceleration of a load;
  means for changing the propagation characteristics of a light beam responsive to the acceleration signal; and bias means for biasing the acceleration signal, said bias means comprising a battery coupled between said sensing means and said means for changing.

6. An accelerometer as recited in claim 4, wherein said bias means comprises:
   a light source producing a bias light beam; and
   a photocell coupled to said light source, coupled between said sensing means and said modulation means, and being irradiated by the bias light beam.

7. An accelerometer as recited in claim 4, wherein said bias means comprises:
   a phase modulator connected to said modulation means;
   a light source producing a bias light beam; and
   a photocell coupled to said light source, connected to said phase modulator and being irradiated by said bias light beam.

8. An accelerometer as recited in claim 1, further comprising bias and calibration means for biasing the electrical acceleration signal and producing a calibration signal.

9. An accelerometer, comprising:
   a piezoelectric crystal coupled to a load and producing an acceleration signal responsive to force applied to said crystal by the load;
   a photocell connected to said crystal and biasing the acceleration signal responsive to a bias light beam; and
   an optical phase modulator connected to said crystal and said photocell, and phase modulating a sensing light beam responsive to the biased acceleration signal.

10. A system for measuring acceleration of a load, said system comprising:
    a laser producing a light beam;
    modulation means for electrically phase modulating the light beam responsive to an electrical signal dependent on acceleration of the load; and
    a detector, coupled to said modulation means, for detecting the phase modulation of the light beam.

11. A system for measuring acceleration of a load, said system comprising:
    a laser producing a light beam;
    modulation means for phase modulating the light beam responsive to acceleration of the load, said modulation means comprising:
    a piezoelectric crystal coupled to the load and producing an acceleration signal; and
    an optical phase modulator coupled to said laser and connected to said crystal; and
    a detector, coupled to said modulation means, for detecting the phase modulation of the light beam.

12. A system as recited in claim 10, further comprising:
    a beam splitter coupled to said laser;
    a first optical fiber coupled between said splitter and said detector;
    a second optical fiber coupled between said splitter and said modulation means, and said first and second optical fibers travelling parallel paths between said splitter and said modulation means; and
    a third optical fiber coupled between said modulation means and said detector, said first and third optical fibers traveling parallel paths between said modulation means and said detector.

13. A system for measuring acceleration of a load, said system comprising:
    a laser producing a light beam;
    modulation means for phase modulating the light beam responsive to acceleration of the load;
    a detector, coupled to said modulation means, for detecting the phase modulation of the light beam;
    a first beam splitter coupled to said laser producing a reference beam and a sensing beam;
    a second beam splitter coupled to said first beam splitter and said detector, and transmitting the reference beam;
    a third beam splitter coupled to said first beam splitter, said detector and said modulation means, and transmitting the sensing beam through said modulation means;
    a first reflector coupled to said second beam splitter and reflecting the reference beam back to said second beam splitter, said second beam splitter transmitting the reflected reference beam to said detector; and
    a second reflector coupled to said modulation means, reflecting the sensing beam back through said modulation means to said third beam splitter, said third beam splitter transmitting the reflected sensor beam to said detector.

14. A system as recited in claim 13, wherein the reference and sensing beams travel parallel paths.

15. A system for measuring acceleration of a load, said system comprising:
    a laser producing a light beam;
    a first beam splitter, coupled to said laser, producing a reference beam and a sensing beam from the light beam;
    a second beam splitter coupled to said first beam splitter and transmitting the reference beam;
    a third beam splitter coupled to said first beam splitter and transmitting the sensing beam;
    a first reflector coupled to said second beam splitter and reflecting the reference beam back to said second beam splitter;
    a detector coupled to said second beam splitter and receiving the reflected reference beam;
    a piezoelectric crystal coupled to the load and producing an acceleration signal responsive to acceleration of the load;
    an optical phase modulator connected to said crystal, coupled to said third beam splitter and phase modulating the sensing beam responsive to the acceleration signal; and
    a second reflector coupled to said modulator, reflecting the phase modulated sensing beam back through said modulator and to said detector through said third beam splitter.

16. A method of detecting acceleration of a load, comprising the steps of:
    (a) producing an electrical acceleration signal responsive to acceleration of the load; and
    (b) electrically changing propagation characteristics of a light beam responsive to the electrical acceleration signal.

17. A method as recited in claim 16, wherein step (b) comprises electrically changing an index of refraction of a material through which the light beam passes.

18. A method as recited in claim 17, further comprising biasing the electrical acceleration signal.

* * * * *